United States Patent [19]

Cherry

[11] Patent Number: 4,798,943

[45] Date of Patent: Jan. 17, 1989

[54] METHOD AND SYSTEM FOR CONTROL OF A BAR CODE SCANNER THRESHOLD

[75] Inventor: Craig D. Cherry, Eugene, Oreg.

[73] Assignee: Spectra-Physics, Inc., San Jose, Calif.

[21] Appl. No.: 913,728

[22] Filed: Sep. 30, 1986

[51] Int. Cl.[4] .............................................. G06K 7/10
[52] U.S. Cl. ...................................... 235/463; 235/466
[58] Field of Search ........................ 235/463, 466, 462

[56] References Cited

U.S. PATENT DOCUMENTS

| | | | |
|---|---|---|---|
| 3,991,299 | 11/1976 | Chadima, Jr. et al. | 235/463 |
| 3,993,894 | 11/1976 | Walker | 235/466 X |
| 4,000,347 | 12/1976 | Hebert et al. | 235/462 |
| 4,219,152 | 8/1980 | Couch et al. | 235/463 |
| 4,323,772 | 4/1982 | Serge | 235/463 |
| 4,354,101 | 10/1982 | Hester et al. | 235/466 X |
| 4,528,443 | 7/1985 | Smith | 235/463 X |
| 4,528,444 | 7/1985 | Hara et al. | 235/463 X |
| 4,740,675 | 4/1988 | Brosnan et al. | 235/462 |
| 4,749,879 | 6/1988 | Peterson et al. | 235/462 X |

*Primary Examiner*—Patrick R. Salce
*Assistant Examiner*—Marc S. Hoff
*Attorney, Agent, or Firm*—Donald C. Feix; Paul Davis; T. M. Freiburger

[57] ABSTRACT

A system for control of a bar code scanner threshold with deliberate decay includes monitoring a selected scan signal characteristic of characteristics and electronically determining whether sets of signal characteristics represent a bar code or extraneous noise, and, if noise is indicated, raising the black/white threshold until noise is no longer detected. The monitored characteristics can include frequency of perceived black/white transition. In a preferred embodiment, the raw scan signal is processed through two circuits, a first circuit wherein a threshold is generated based on the signal and a selected threshold criterion, and a second circuit wherein the threshold generated in the first circuit is applied to the signal to produce a bar signal output, which output is then monitored by a noise recognition device. If noise is perceived by the noise recognition device, a threshold offset signal is generated. The threshold generated in the first circuit is raised by adding to it the threshold offset signal. Then the raised threshold is fed through a threshold detection device in a third circuit which also receives the scan signal, to produce an output bar signal which substantially excludes noise readings. In this way, although the threshold will decay to accommodate changing conditions, it will be raised as necessary if it goes so low as to start reading noise.

13 Claims, 2 Drawing Sheets

METHOD AND SYSTEM FOR CONTROL OF A BAR CODE SCANNER THRESHOLD

BACKGROUND OF THE INVENTION

The invention relates to bar code scanning, and more particularly to a threshold control for interpreting the signal from a bar code scanner having a floating and decaying threshold.

In bar code reading, a reflected light signal is received and interpreted by the reading apparatus when the scanner is on. Intensity of the light signal varies, corresponding to light and dark (or white and black) elements being scanned. Generally, the bar code scanners encounter many different types of lighting conditions in the reading of bar codes, including wide variations in the maximum reflected light received under different conditions and also wide variations in the contrast between the reflected signal received from a black bar and that received from a white bar. A decision must be made as to whether a particular signal level represents black or white when interpreting the signal.

Therefore, bar code reading systems have sometimes included circuitry adapted to apply a floating threshold in the interpretation of black versus white. A typical system might use the derivative of signal strength with respect to time to detect transitions from black to white or white to black. For example, the circuitry might look at the maxima of the derivative signal received, then apply a certain percentage of the maximum positive or negative derivative signal value, to establish a positive or negative derivative signal level threshold. A derivative signal above the positive threshold or below the negative threshold will indicate a space-bar or bar-space transition. The specific circuit implementation determines which transition a positive signal represents.

Once selected in this way, the threshold should not remain fixed because the scanner almost always encounters different conditions which will vary the strength of the received signals. These differing conditions include changes in ambient light, glare, angle of approach, distance to the bar code, relative velocity of bar code and scanning spot (in the case of a flying spot scanner), varying reflectivity of the material being scanned, component drift, and variation in the power of the laser source.

Therefore, in many beam scanner bar code readers, the threshold is continually being adjusted while the scanner is on.

In a period of time when the scanner does not see a bar code, few if any strong transitions in the strength of the signal will be seen. Since the interpretive circuitry does not recognize whether this is due to the absence of a bar code or due to a change in conditions resulting in lower signal strength and contrast, the thresholds are normally caused to automatically "decay" over time, i.e. to become progressively lower so that signal transitions will again be picked up by the reading circuitry. The time constant of the decay is on the same order as the time to scan a few elements of the bar code. One method of implementing the decaying threshold is to represent the threshold value as a voltage on a capacitor, discharging through a resistor to provide a gradual decay. Such a decaying threshold will tend to produce perceived black/white transitions when the beam is scanned over plain paper, for example. Characteristics of the surface of the paper and the grain of the paper result in varying reflectivity which, even though at very low contrast, will appear to be bar code transitions when the threshold has decayed to a very low value. Thus, what is really noise can appear to be black/white transitions from a bar code. There has been a problem in the prior art, of compensating for or overcoming the condition of extraneous noise being perceived as black/white transitions.

A principal problem is that bar code reading is not performed efficiently if the reading mechanism spends an unnecessary amount of time trying to read noise. A second problem is the possible apparent loss of the le during white space before the bar code, the lack of which makes reliable decoding more difficult.

There have been several approaches to this problem. In one approach, a fixed bottom level was established for a black/white reading threshold, to guarantee that the decaying threshold could not become low enough to read noise such as that resulting from low contrasts in the grain or surface texture of paper. This was only a limited solution, since there is a need for the threshold to go quite low when a scanner is used at a relatively great distance from the label, or with low contrast labels. Wide differences in the distance at which the gun is used necessitate a wide range of possible thresholds.

A different approach also encompassed by the prior art was the use of a dynamic threshold in a hand held scanner, coupled with an analog delay line. Bar code readers using this approach included a special integrated circuit to delay the signal in one circuit, while using the signal instantaneously in another circuit. In the delay circuit, the signal was delayed for several milliseconds before a threshold was applied to it. Meanwhile, in the other circuit the signal was used instantaneously for establishing the threshold, using, for example, a fixed percentage of the peak derivative signal strength.

These analog delay line systems are effective in preserving the leading white space before the label, but not in removing noise elsewhere.

It is among the objects of the present invention to provide a relatively simple solution to the problem of noise pickup with scanner threshold decay, by utilizing some knowledge of the characteristics of a bar code signal and the characteristics of noise signals, to discern the difference between them and to raise the black/white signal threshold so long as noise continues to be detected.

SUMMARY OF THE INVENTION

In accordance with the present invention, the output data of a bar code reader is constantly examined for characteristics indicating noise, rather than bar code being read. For example, the noise might have a frequency characteristic which is very different from that of a bar code. If the smallest size of bar or space at the maximum spot speed of a particular scanner results in bar signal transitions at about a ten microsecond interval, and typical noise sources which might be encountered have a period of about five microseconds, then by looking at the pulse widths the system of the invention can determine that if the pulse widths are less than some limit, for example eight microseconds, noise is being read and the threshold level should be raised slightly. This process can continue until noise is no longer detected.

Since the system operates on the principle of changing a threshold until a certain characteristic or condition is no longer seen, there must be either some provision for deliberate threshold decay, or an additional channel of bar and space measurement should be provided using a non-modified threshold to detect noise. In addition to or as an alternative to frequency as a test for a valid signal, other criteria can be used, such as the presence of wide and narrow bars, the degree of contrast, or noise of a lower frequency rather than a higher frequency as compared to the signal.

In this way, the present invention enables the more efficient use of a bar code scanner, particularly a portable or hand held scanner, by eliminating much of the time ordinarily used by the scanner in attempting to read noise. As another advantage, the invention eliminates the need for an analog delay line to obtain noise free leading margins. Thus, the equipment is simplified, its workload is reduced and it is possible to speed up and simplify the decoding process.

In accordance with a preferred embodiment of the invention, a method for controlling threshold in a bar code scanner having a variable black/white scan signal processing threshold subject to threshold decay includes monitoring selected scan signal characteristics and determining, electronically, whether sets of signal characteristics represent a bar code or extraneous noise, and, if noise is indicated, raising the black/white threshold until noise is no longer detected.

In one preferred embodiment the monitored scan signal characteristics include frequency of perceived black/white transition.

In a specific embodiment of the method of the invention, the signal received from the scan is processed through two parallel circuits: a first circuit wherein a threshold is generated based on the signal and a selected threshold criterion, and a second circuit wherein the threshold generated in the first circuit is applied to the signal to produce a bar signal output, which output is then monitored by a noise recognition means. If noise is perceived by the noise recognition means, a threshold offset signal is generated. The threshold generated in the first circuit is then raised by adding to it the threshold offset signal. The raised threshold is then fed through a threshold detection means in a third circuit which also receives the scan signal, to produce an output bar signal which substantially excludes noise readings.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF PREFERRED EMBODIMENTS

Figure 1:
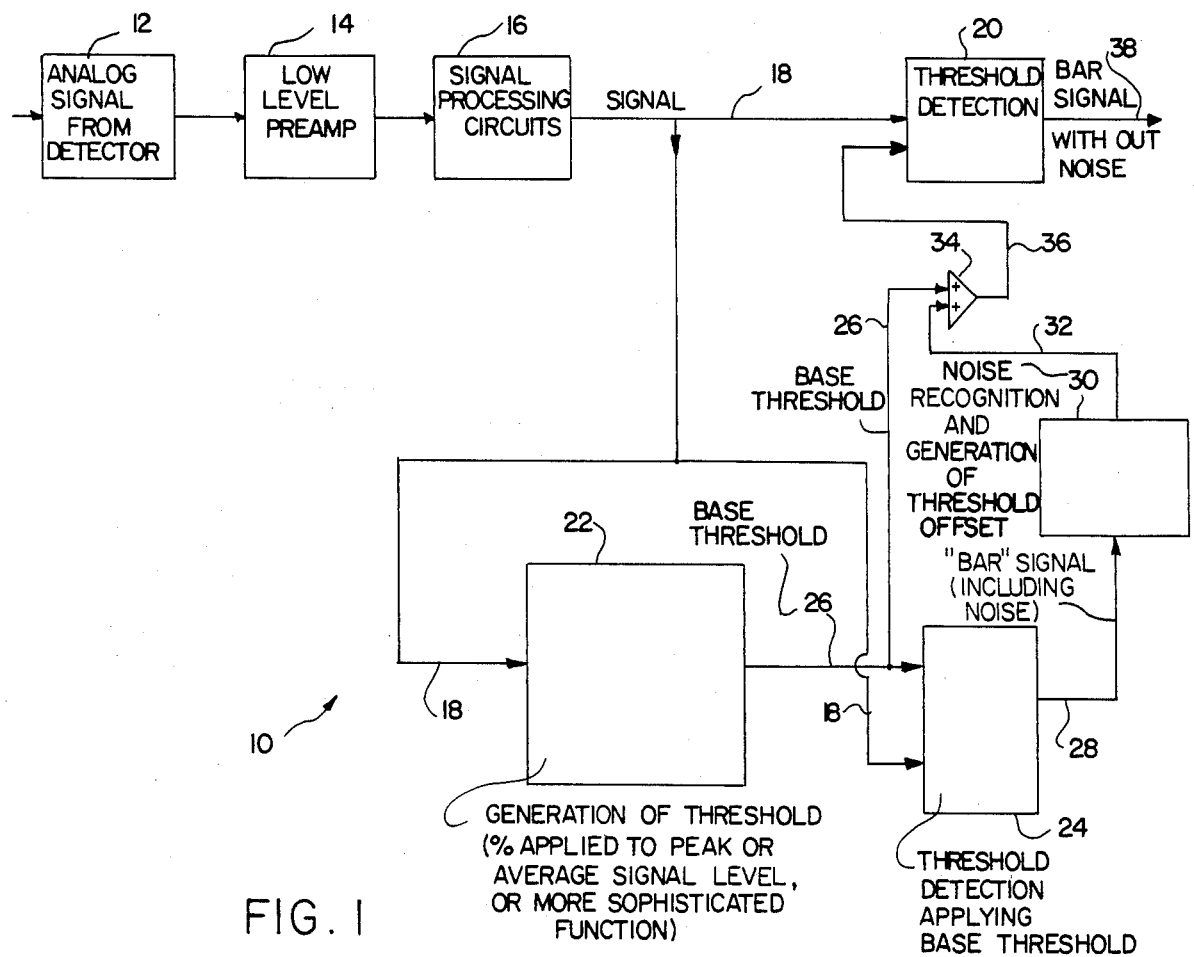

FIG. 1 shows one preferred form of detection circuit in accordance with the invention for efficiently producing a bar signal without noise, while still accommodating a wide range of signal level.

In FIG. 1 the illustrated circuit 10 shows an analog signal 12 coming from the detector of the bar code scanner and being amplified by a low level preamplifier 14. The amplified signal is processed by signal processing circuits 16, which may use the derivative of detected light signal with respect to time, and the emerging signal 18 is then directed to three different locations: to a final threshold detection 20; to a base threshold generator 22; and to threshold detection 24 applying a base threshold from the base threshold generator 22.

The base threshold generator 22 may be of the typical kind for generating a floating threshold based on a percentage of peak or average signal level, for example, or it may generate the floating threshold by more sophisticated functions, as have been known in the prior art. However, the threshold generator 22 only produces a base threshold 26, which is preliminarily used for comparison with the signal 18 in the threshold detection apparatus 24, for producing an initial black/white transition signal or "bar" signal which may consist entirely of noise. The generator 22 includes provision for threshold decay, as discussed above and known in the prior art.

The "bar" signal 28 is fed to a noise recognition device 30 which will generate a threshold offset signal in the event that it detects that noise is being read, rather than a possible bar code. The apparatus 30 may comprise, for example, a frequency to voltage converter, or filter and rectifier, to develop a fluctuating DC voltage which is a function of the input signal frequency.

The emerging signal 32 from the noise recognition and threshold offset generator 30 may have a positive value or it may be zero. It is fed to an adding amplifier 34, which also receives the base threshold 26, as indicated in FIG. 1, and adds the threshold offset to the base threshold.

The emerging adjusted threshold signal 36 has been increased if the device 30 has recognized noise and no bar code, or is equal to the base threshold 26 if the device 30 recognized a potential bar code. In any event, the adjusted threshold 36 is conducted to the main threshold detection device 20, which also receives the signal 18, and this is where the black/white decisions are made on the signal 18. Thus, with the threshold 36 always rising to a level which excludes the reading of noise, the output of the threshold detection 20 is a true bar signal 38, without noise.

Figure 2:
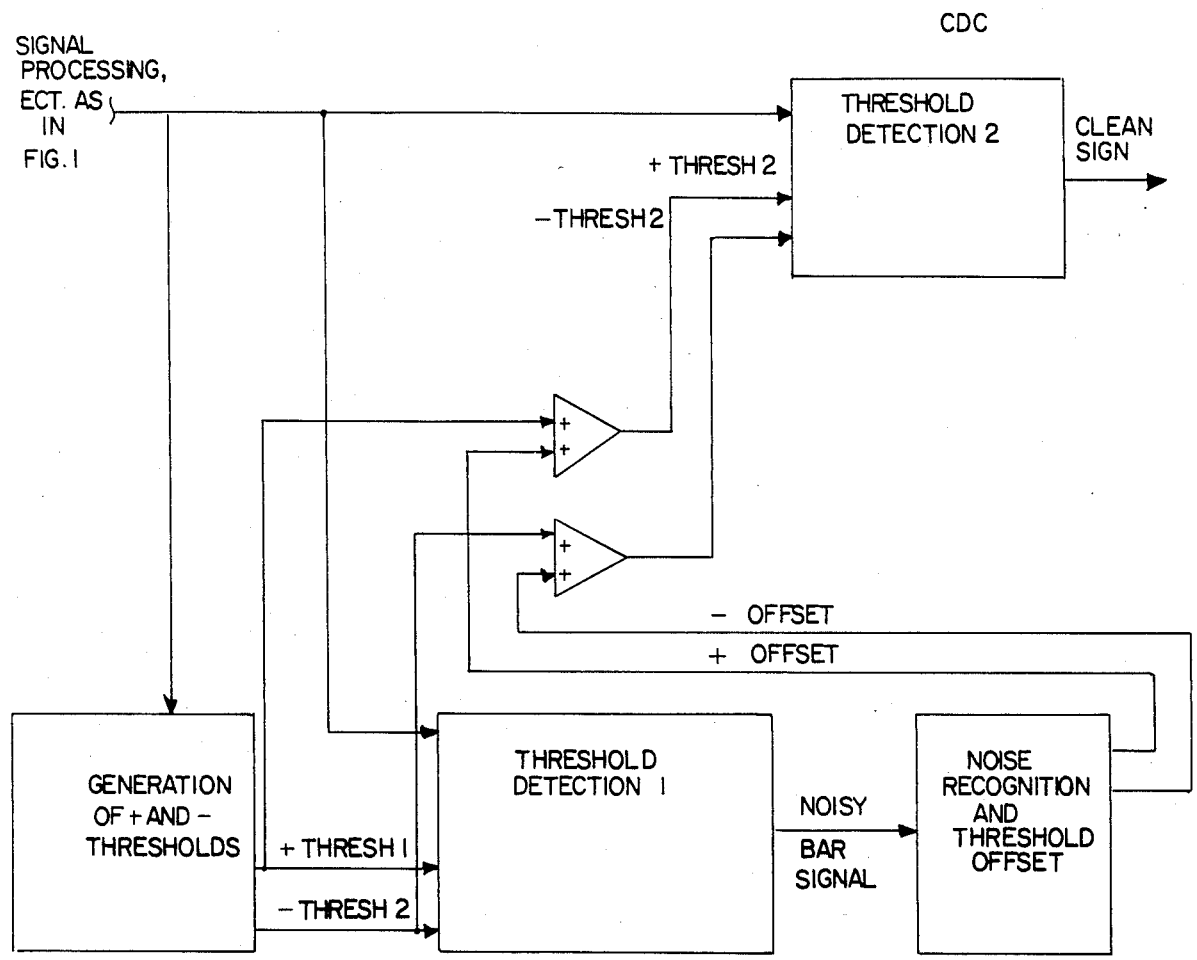

FIG. 2 shows a variation of the circuit of FIG. 1. The embodiment of FIG. 2 employs separate and independent positive and negative threshold levels and offsets to more accurately follow the positive and negative excursions of the derivative signal from the processing circuits. The derivative signal is centered around zero, and in order to enable more accurate tracking of the signal's excursions, which might not be symmetrical around zero, separate and independent thresholds are used. Otherwise, the system and method represented in FIG. 2 are conceptually similar to those of FIG. 1.

The invention may be implemented using digital circuits to perform the functions described, by including an analog to digital converter in the signal processing circuits 16 of FIG. 1. In this case a simple embodiment of the noise detection apparatus 30 could consist of a means of numerically making bar and space width measurements with limits determined by characteristics of the bar codes and the bar code reader. The threshold levels could be represented as numerical values modified over time. An alternative noise detection means is computation of a running ratio of wide to narrow element width, which could be compared with limits based on characteristics of the bar codes and the bar code reader.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a bar code scanner having a variable black/white scan signal processing transition threshold derived from a function of the reflected light levels received by the scanner, said variable threshold being subject to threshold decay, a method for controlling threshold to produce a substantially noise-free bar signal, comprising, monitoring selected scan signal characteristics and determining, electronically, whether sets of signal characteristics represent a bar code or extraneous noise, and if a set of signal characteristics indicates noise, raising the black/white threshold value level until noise is no longer detected.

2. The method according to claim 1, wherein the monitored scan signal characteristics include frequency of perceived black/white transition.

3. The method according to claim 1, wherein the signal received from the scan is processed through two parallel circuits: a first circuit wherein a threshold is generated based on the signal and a selected threshold criterion, and a second circuit wherein the threshold generated in the first circuit is applied to the signal to produce a bar signal output, which output is then monitored by a noise recognition means, and, if noise is perceived, a threshold offset signal is generated; and including raising the threshold value level generated in the first circuit by adding to it the threshold offset signal, and feeding the raised threshold through a threshold detection means in a third circuit which also receives the scan signal, to produce an output bar signal which substantially excludes noise readings.

4. The method according to claim 3, wherein the monitored scan signal characteristics include frequency of occurrence of perceived black/white transitions.

5. The method according to claim 1, wherein the monitored scan signal characteristics include a ratio of maximum duration to minimum duration of the perceived black/white elements.

6. The method according to claim 3, wherein the monitored scan signal characteristics include a ratio of maximum duration to minimum duration of perceived black/white elements.

7. The method according to claim 1, wherein a derivative with respect to time of the amplitude of the scan signal is used for generating threshold and for threshold detection, and including generating separate and independent positive and negative threshold levels end threshold offset signals for the positive and negative threshold levels, and when noise is detected, raised both the positive and negative threshold levels by applying the threshold offset signals, until noise is no longer detected.

8. In a bar code scanner having a variable black/white scan signal processing transition threshold derived from a function of the reflected light levels received by the scanner, said variable threshold being subject to threshold decay, a system for controlling threshold, comprising, means for monitoring selected scan signal characteristics and for determining, electronically, whether sets of signal characteristics represent a bar code or extranseous noise, and means for raising the black/white threshold value level if a set of signal characteristics indicates noise, until noise is no longer detected.

9. The system of claim 8, wherein the monitored scan signal characteristics include frequency of perceived black/white transition.

10. The system of claim 1, including means for processing the signal received from the scan through two parallel circuits: a first circuit wherein a threshold is generated based on the signal and a selected threshold criterion, and a second circuit wherein the threshold generated in the first circuit is applied to the signal to produce a bar signal output, which output is then monitored by a noise recognition means, and, if noise is perceived, a threshold offset signal is generated; and including means for raising the threshold generated in the first circuit by adding to it the threshold offset signal, and for feeding the raised threshold through a threshold detection means in a third circuit which also receives the scan signal, to produce an output bar signal which substantially excludes noise readings.

11. The system of claim 10, wherein the monitored scan signal characteristics include frequency of occurrence of perceived black/white transitions.

12. The system of claim 8, wherein the monitored scan signal characteristics include a ratio of maximum duration to minimum duration of the perceived black/white elements.

13. The system of claim 10, wherein the monitored scan signal characteristics include a ratio of maximum duration to minimum duration of perceived black/white elements.

* * * * *